United States Patent
Li

(10) Patent No.: US 9,581,829 B1
(45) Date of Patent: Feb. 28, 2017

(54) EYEGLASS ASSEMBLY

(71) Applicant: SUN SIGHT GLASSES CO., LTD., Tainan (TW)

(72) Inventor: Jui-Chi Li, Tainan (TW)

(73) Assignee: Sun Sight Glasses Co., Ltd., Tainan (TW)

( * ) Notice: Subject to any disclaimer, the term of this patent is extended or adjusted under 35 U.S.C. 154(b) by 0 days.

(21) Appl. No.: 15/080,831

(22) Filed: Mar. 25, 2016

(51) Int. Cl.
G02C 1/00 (2006.01)
G02C 1/06 (2006.01)

(52) U.S. Cl.
CPC ........... *G02C 1/06* (2013.01); *G02C 2200/06* (2013.01)

(58) Field of Classification Search
CPC .............................. G02C 1/10; G02C 2200/06
USPC .................. 351/86, 83, 96, 90, 106, 103
See application file for complete search history.

(56) References Cited

U.S. PATENT DOCUMENTS

| | | | | |
|---|---|---|---|---|
| 4,340,282 A * | 7/1982 | Murakami | ............... | G02C 1/10 351/154 |
| 5,400,089 A * | 3/1995 | Danloup | .................. | G02C 1/10 351/154 |
| 6,074,059 A * | 6/2000 | Glass | ....................... | G02C 1/06 351/83 |
| 6,588,897 B1 * | 7/2003 | Nadler | ..................... | G02C 1/06 351/154 |

* cited by examiner

*Primary Examiner* — Hung Dang
(74) *Attorney, Agent, or Firm* — Rosenberg, Klein & Lee

(57) ABSTRACT

An eyeglass assembly is revealed. The eyeglass assembly mainly includes lenses assembled with an eyeglass frame. Each lens is disposed with a covering portion that shields an outer edge of the eyeglass frame. A locking portion is formed by inward extension of the covering portion and is against the inner surface of the eyeglass frame. A circular slot is arranged between the locking portion and the covering portion, and is used for mounting and locking the eyeglass frame. Thereby the lenses are secured firmly on the eyeglass frame. The lenses of the present invention are assembled with the eyeglass frame in different way so as to get a pair of novel and attractive eyeglasses.

1 Claim, 3 Drawing Sheets

EYEGLASS ASSEMBLY

BACKGROUND OF THE INVENTION

Field of the Invention

The present invention relates to an eyeglass assembly, especially to a novel and attractive eyeglass assembly in which lenses are secured stably.

Descriptions of Related Art

Along with progress and improvement of material life, people care more about portable accessories they carry on. In order to make an impact on the appearance and the eyeglasses match user's clothing, sunglasses and sports eyeglasses are getting more popular. The sunglasses and sports eyeglasses have different designs and styles so that users can select the eyeglasses with different styles or lenses depending on their mood and clothing.

Generally, eyeglasses include an eyeglass frame, two lenses mounted on apertures of the eyeglass frame, and two temples pivotally connected to two sides of the eyeglass frame respectively. A mounting lost is disposed on an inner side of each side of the eyeglass frame and the lenses are pressed into the mounting slots respectively due to material elasticity of the eyeglass frame during assembly of the lenses. Then the lenses are completely covered by the eyeglass frame. This is a pair of traditional style eyeglasses.

In order to make the eyeglasses match the user's clothing, the eyeglasses are versatile such as a half frame type, or even a frameless type besides the traditional full frame type. Take the frameless type eyeglasses as an example. A hole is formed on the lens by drilling and is used to fasten the lens with the temple. The assembly of this type of eyeglasses is trouble and the eyeglasses are easy to get damaged or cracked due to the drilling process or the external force for fastening. Or a cord is used to wrap around the lens for positioning the lens and producing the frameless type eyeglasses. However, the fixation strength of the cord is insufficient. Thus the frameless type eyeglasses are easily damaged without the protection of the eyeglass frame.

Thus there is room for improvement and a need to provide a novel eyeglass assembly that overcomes the shortcomings mentioned above.

SUMMARY OF THE INVENTION

Therefore it is a primary object of the present invention to provide a novel and attractive eyeglass assembly in which lenses are positioned and fixed stably by both the inner side and the outer side of the lenses being mounted and locked.

In order to achieve the above object, an eyeglass assembly according to the present invention mainly includes lenses assembled with an eyeglass frame. The lens is arranged with a covering portion that shields an outer edge of the eyeglass frame. A locking portion is formed by inward extension of the covering portion and is against the inner surface of the eyeglass frame. A circular slot is arranged between the locking portion and the covering portion, and is used for mounting and locking the eyeglass frame. Thereby the lenses are secured firmly on the eyeglass frame. The lenses of the present invention are assembled with the eyeglass frame in different way so as to get a pair of novel and attractive eyeglasses.

Compared with the structure available now, the present invention has the following advantages:

1. The lens is secured firmly by the locking portion and the covering portion on the inner side and the outer side thereof respectively.

2. The design of the covering portion used for shielding the eyeglass frame makes the assembly of the lenses different from that of the eyeglasses available on the market. Thus the present eyeglass assembly is unique and beautiful.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
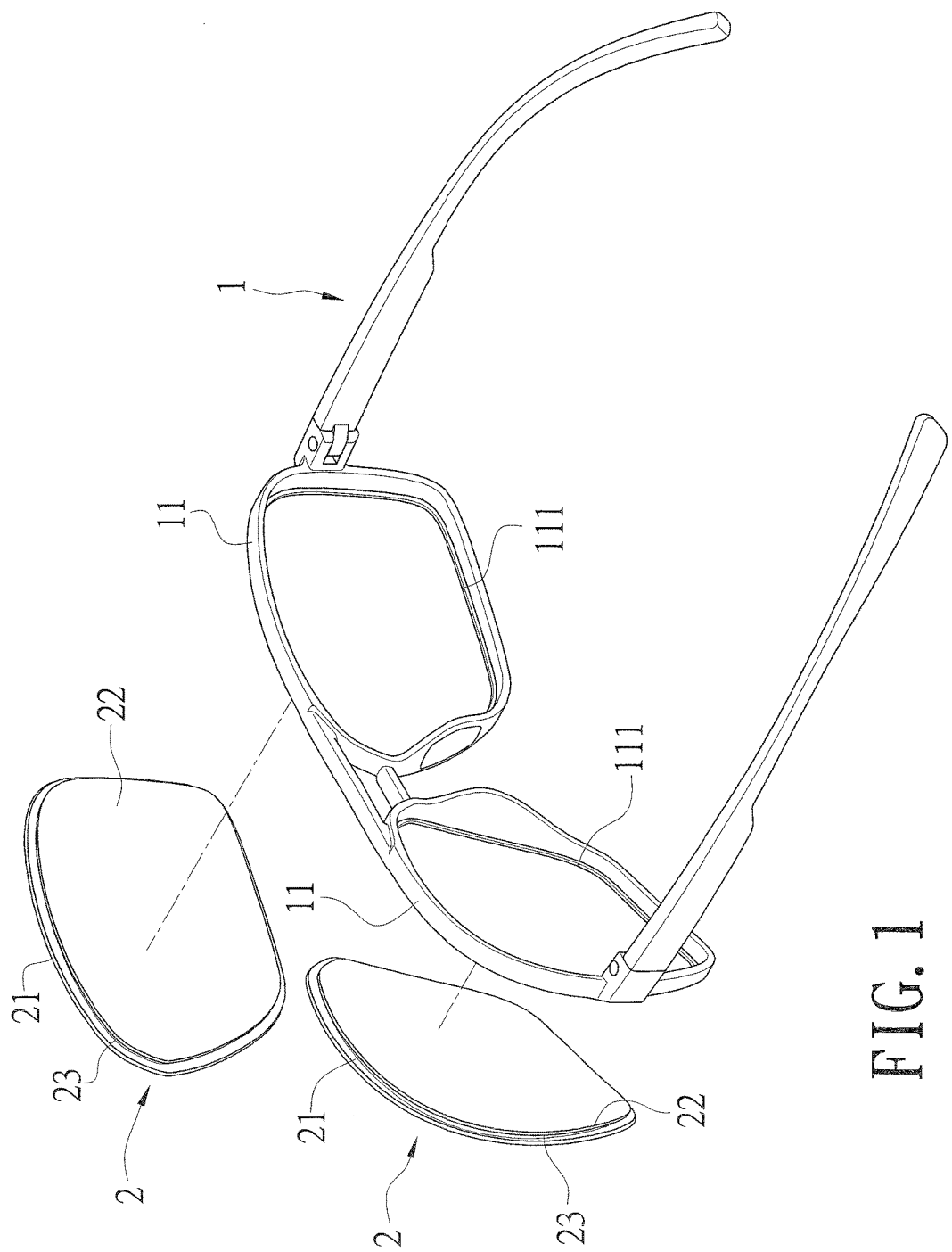
FIG. 1 is an explosive view of an embodiment according to the present invention.
Figure 2:
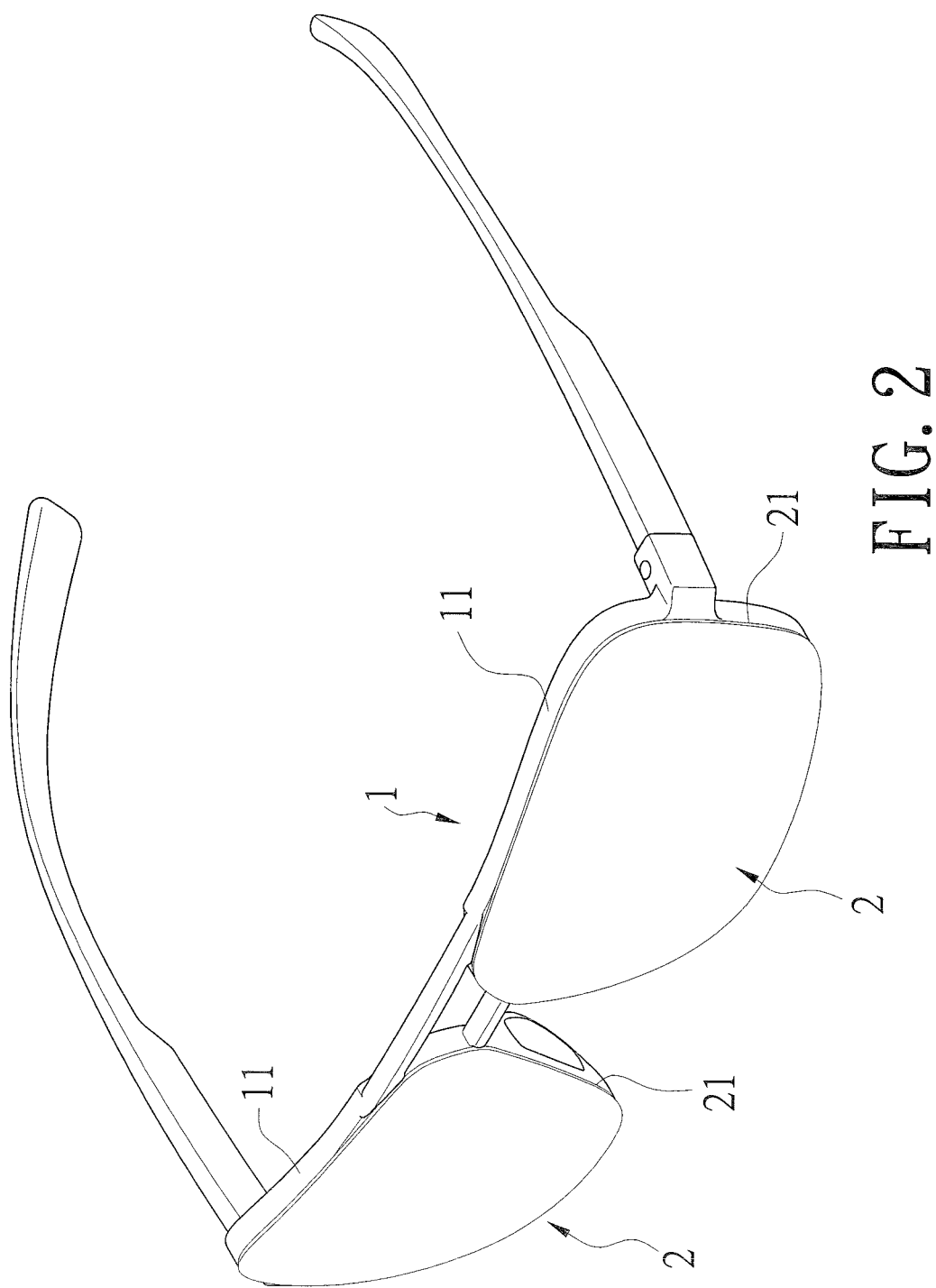
FIG. 2 is a perspective view of an embodiment according to the present invention.
Figure 3:
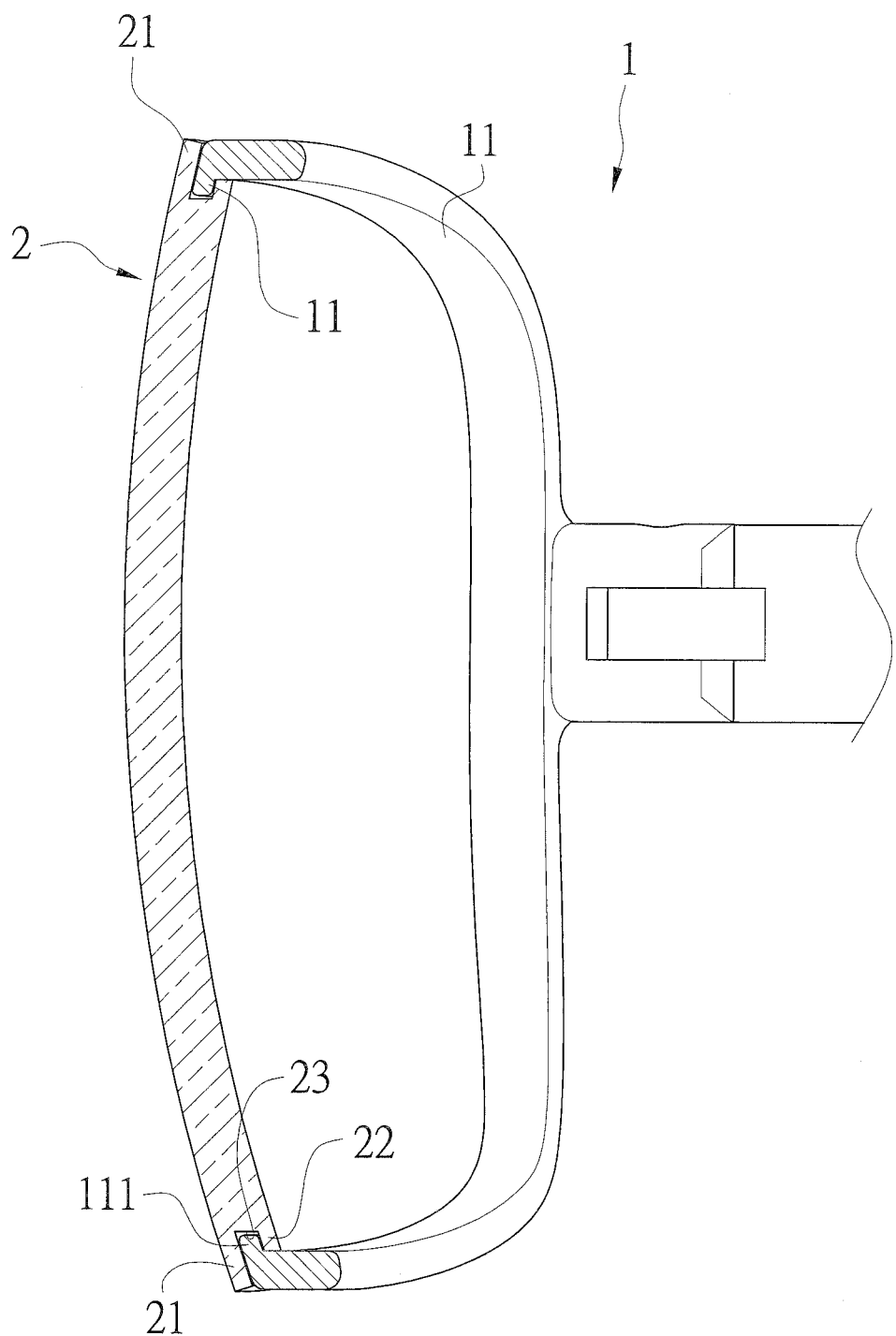
FIG. 3 is a longitudinal cross sectional view of an embodiment according to the present invention.

Refer to FIGS. 1-3, an eyeglass assembly of the present invention according to the present invention includes an eyeglass frame 1 and two lenses 2.

The eyeglass frame 1 consists of a left frame portion 11 and a right frame portion 11. A circular projecting edge 111 is arranged at the edge of an inner side of the frame portion 11.

Each lens 2 is mounted into the frame portion 11 correspondingly. The lens 2 is composed of a covering portion 21, a locking portion 22 and a circular slot 23. The covering portion 21 shields the outer edge of the frame portion 11 while the locking portion 22 is formed by inward extension of the covering portion 21 and is against the inner surface of the frame portion 11. The circular slot 23 is located between the locking portion 22 and the covering portion 21, and is used for receiving the circular projecting edge 111 of the frame portion 11.

While assembling the lens 2, the locking portion 22 of the lens 2 is mounted into the frame portion 11 and locked in the inner surface of the frame portion 11. At the same time, the circular projecting edge 111 of the frame portion 11 is mounted and fixed in the circular slot 23 of the lens 2. Thus the covering portion 21 of the lens 2 covers over the edge of the frame portion 11. Thereby the lens 2 is mounted tightly and stably by the locking portion 22 and the covering portion 21 on the inner side and the outer side thereof respectively. After being assembled, the assembly of the lenses 2 is different from that of the eyeglasses available on the market due to the design of the covering portion 21 that covers over the frame portion 11. The assembly of the lenses 2 is novel and attractive.

In summary, the present invention has the following advantages compared with the structure available now:

1. The lenses are fixed tightly and stably by the locking portion and the covering portion on the inner side and the outer side thereof.

2. The assembly of the lenses of the present invention is different from that of the eyeglasses available on the market due to the design of the covering portion that shields the eyeglass frame. Thus the present eyeglass assembly is cool and fashionable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An eyeglass assembly comprising:
an eyeglass frame having a left frame portion and a right frame portion, each of which is disposed with a circular projecting edge at an edge of an inner side thereof; and
two lenses that are mounted into the left frame portion and the right frame portion respectively; wherein each lens includes a covering portion that shields an outer edge of the eyeglass frame, a locking portion that is formed by inward extension of the covering portion and is against an inner surface of the eyeglass frame, and a circular slot that is arranged between the locking portion and the covering portion and is used for mounting and locking the circular projecting edge of the eyeglass frame.

* * * * *